United States Patent [19]

Carr et al.

[11] Patent Number: 4,845,502
[45] Date of Patent: Jul. 4, 1989

[54] DIRECTION FINDING METHOD AND APPARATUS

[76] Inventors: James L. Carr, ORI, Inc., 8201 Corporate Dr., #350, Landover, Md. 20785; Marvin S. Maxwell, 1118 N. Belgrade Rd., Silver Spring, Md. 20902

[21] Appl. No.: 178,976
[22] Filed: Apr. 7, 1988
[51] Int. Cl.⁴ .............................................. G01S 5/02
[52] U.S. Cl. .................................................. 342/430
[58] Field of Search .............. 342/398, 400, 428, 430, 342/432, 442, 443, 449

[56] References Cited

U.S. PATENT DOCUMENTS

| | | |
|---|---|---|
| Re. 28,725 | 2/1976 | Hutchinson et al. . |
| 1,952,879 | 3/1934 | Martin . |
| 2,189,517 | 2/1940 | Gothe . |
| 2,406,406 | 8/1946 | Sandretto et al. . |
| 2,563,998 | 8/1951 | Foster . |
| 2,644,158 | 6/1953 | Thrift . |
| 2,746,037 | 5/1956 | McCoy . |
| 2,879,506 | 3/1959 | Byatt . |
| 2,922,154 | 1/1960 | Granqvist . |
| 2,946,998 | 7/1960 | Jolliffe et al. . |
| 2,953,782 | 9/1960 | Byatt . |
| 3,093,828 | 6/1963 | Stutz . |
| 3,231,890 | 1/1966 | Hoover . |
| 3,325,814 | 6/1967 | Stromswold . |
| 3,355,737 | 11/1967 | Byatt . |
| 3,711,820 | 1/1973 | Starkey . |
| 3,763,465 | 10/1973 | Tatge et al. . |
| 3,766,560 | 10/1973 | Bornhorst et al. . |
| 4,019,184 | 4/1977 | Dorey . |
| 4,368,470 | 1/1983 | Mori et al. . |
| 4,507,663 | 3/1985 | Mori et al. ........................ 342/440 |
| 4,621,267 | 11/1986 | Wiley . |
| 4,626,859 | 12/1986 | Stansfield ........................ 342/442 |
| 4,626,861 | 12/1986 | Wiley . |

Primary Examiner—Theodore M. Blum
Attorney, Agent, or Firm—Jones, Tullar & Cooper

[57] ABSTRACT

A direction finding method and apparatus utilizes two receiving antennas which are disposed on a baseline that is rotated around its midpoint at a constant angular velocity. Signals received from a transmitter by the antennas are processed by circuitry that includes a balanced mixer. The balanced mixer multiplies the signals from the two antennas, which are time varying and of different phase due to their rotation and spacing. The output from the balanced mixer is a signal which includes a high frequency component, and a low frequency component. The high frequency component can be used to determine incoming signal amplitude and frequency. The low frequency component can be used to determine the azimuth and elevation angles of the transmitter relative to the plane of rotation of the receiver through analysis of the signal at a number of different times.

6 Claims, 2 Drawing Sheets

DIRECTION FINDING METHOD AND APPARATUS

BACKGROUND OF THE INVENTION

The present invention relates, in general, to a direction finding method and apparatus that can be used to locate the direction of a transmitter from a receiver located in space, on an aircraft, or on a fixed platform.

There are a number of known techniques for locating the position of a transmitter. Once such technique employs a plurality of fixed or rotating directional antennas which find the direction in space where an incoming signal from the transmitter is the strongest, or conversely, where a null output results that is caused by the destructive interference between signals. The simplest of these devices are those that consist of one more directional antennas that can be oriented to provide the greatest signal. Another simple system consists of an antenna pair that is separated by a fixed baseline so that when the incoming signal is incident at specific angles to the baseline, the voltage induced in one antenna is equal and opposite to that induced in the other. The output indication is the voltage sum, and a null output indicates alignment of the baseline with the signal. A disadvantage to these devices is that multiple antenna pairs arranged at crossed axes must be employed to eliminate ambiguities, and permit determination of both the elevation and azimuth angles of the incoming signal.

Another type of direction finding device is an interferometer. These devices employ two or more fixed antennas, and determine the direction of an incoming signal by measuring the phase differences between the signals arriving at the several antennas. Although these devices provide accurate measurements, a single axis interferometer can only measure the angle of signal arrival relative to the interferometer axis. In addition, precision direction finding requires baselines that are longer than one-half wavelength, which implies that ambiguities exist in assigning phase difference to angles of arrival. To resolve these ambiguities, a number of baselines (usually collinear) are required, and as with the previously discussed class of devices, in order to get a two dimensional indication of transmitter position, multiple, or crossed, interferometer axes must be used.

A third type of direction finding devices makes use of the Doppler shift. These devices measure the frequency shift in the received signal. Since the Doppler shift is dependent on the component of the relative velocity between the receiver and the transmitter along the line-of-sight, a single Doppler shift measurement can only determine the angle of arrival relative to the relative velocity vector. An advantage of using the Doppler technique is that the Doppler shift can be assigned to angle of arrival in an ambiguity free manner. A disadvantage of the Doppler technique is that unknown offsets in the transmitter frequency can be misinterpreted as Doppler shifts leading to misplacement of the transmitter. To mitigate this problem as well as to achieve a two-dimensional fix on a transmitter, a transmitter can be multiply observed while the transmitter-receiver geometry varies as, for example, during a satellite overpass. Multiple observations can then be used to solve for the unknown transmitter frequency as well as for angles with respect to several different relative velocity vectors which locate the transmitter. This is the technique used by the SARSAT search and rescue satellite system. Its disadvantage is that it requires multiple observations over a long period of time.

The present invention seeks to overcome the disadvantages of these known direction finding techniques.

SUMMARY OF THE INVENTION

It is therefore the object of the present invention to provide an accurate direction finding method and apparatus which employs a minimum of mechanical components, can provide a two-axis measurement of a transmitter's direction with a minimum of ambiguity through analysis of only a single short transmitted burst and, does not require precise knowledge of the transmitter frequency.

This, and other objects of the invention are attained through the use of a receiver comprising at least one pair of antennas which are disposed, one at each end, of a rotating baseline. As the antennas rotate about the midpoint (or a common point) of the baseline, the phases of the signals received by each of the antennas vary. By multiplying the time varying signals from each antenna in a balanced mixer, and filtering its output, two time varying outputs are generated: a high frequency output, and a low frequency output. The high frequency output is a function, among other variables, of the frequency and amplitude of the transmitted signal. The low frequency output is also a function of the frequency and the amplitude of the transmitted signal, but in addition, is a function of the elevation and azimuth angles of the signal source relative to the plane of rotation of the receiver.

Although a single instantaneous measurement cannot provide a solution to all of the variables, the time varying nature of the functions due to the rotation of the antennas, enables a large number of different values of each output to be obtained in a short period of time. A computer can then be employed to apply a curve fitting technique to the time varying values of the functions, to solve for each of the variables. This is similar to using simultaneous equations to solve for a plurality of variables, and eliminate possible ambiguities.

Unlike the Doppler method, the location of a transmitter can be determined nearly unambiguously from a short transmitted burst using this method. It is envisioned that the rotation rate of the receiver would be high, perhaps as high as 300 to 400 revolutions per minute. In order to obtain enough values to solve for the azimuth and elevation angles without ambiguities, all that would be needed is that values for a substantial portion (e.g., one fourth) of a single rotational cycle of the antenna pair be obtained. Thus a transmission burst of considerably less than one second in duration could still easily provide enough information to allow for an unambiguous determination of the transmitter direction up to a reflection across the plane of rotation of the receiver. This single ambiguity can be easily eliminated if the antennas only have gain on one side of the plane of rotation.

The present invention also differs from a conventional interferometer by virtue of the fact that the antennas are continuously rotated, and the resulting phase signals are time varying. It is the time varying nature of the signals which permits analysis by a computer to eliminate the ambiguities that are normally associated with a single fixed axis interometer. Thus, there is no requirement that more than a single pair of antennas be used to solve for the elevation and azimuth angles. This considerably reduces the complexity and the cost of the mechanical elements of the receiver.

BRIEF DESCRIPTION OF THE DRAWINGS

The foregoing and additional objects, features and advantages of the present invention will become apparent to those of skill in the art from the following more detailed consideration thereof taken in conjunction with the accompanying drawings, in which.

DETAILED DESCRIPTION OF THE PREFERRED EMBODIMENT

Figure 1:
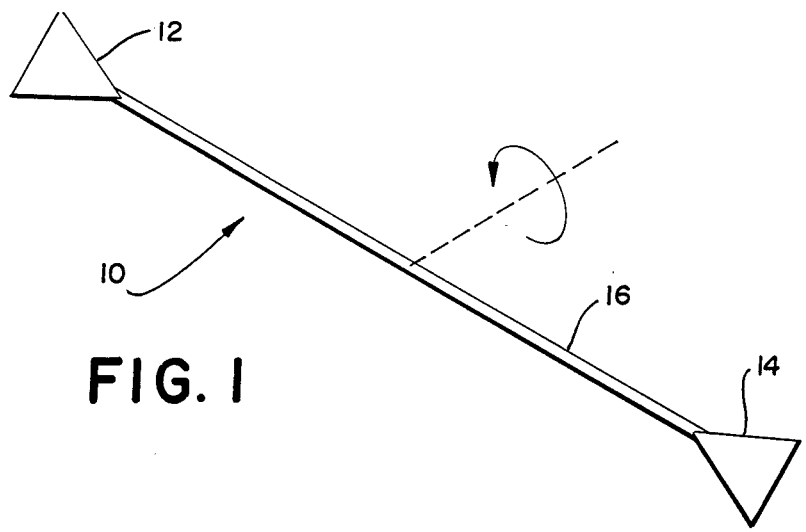
FIG. 1 is a diagrammatic illustration of a rotating receiving antenna pair which forms a part of the present invention.

Turning now to a more detailed consideration of the present invention, there is illustrated in FIG. 1, a rotating direction finding receiver 10, which includes two loop or directional antennas 12 and 14. These are disposed at either end of a shaft 16, that forms a baseline between the two antennas. The direction finding receiver can be mounted by any suitable support (not shown) to a structure such as a satellite, aircraft, or fixed platform. Also, any suitable motor and gear arrangement can be employed to cause rotation of receiver 10 about its rotational axis as indicated by the rotational arrow in FIG. 1. It is preferred that the antenna patterns be identical and rotationally symmetric about the axis of rotation of the receiver 10 so that there is no signal modulation due to the antenna patterns.

Figure 2:
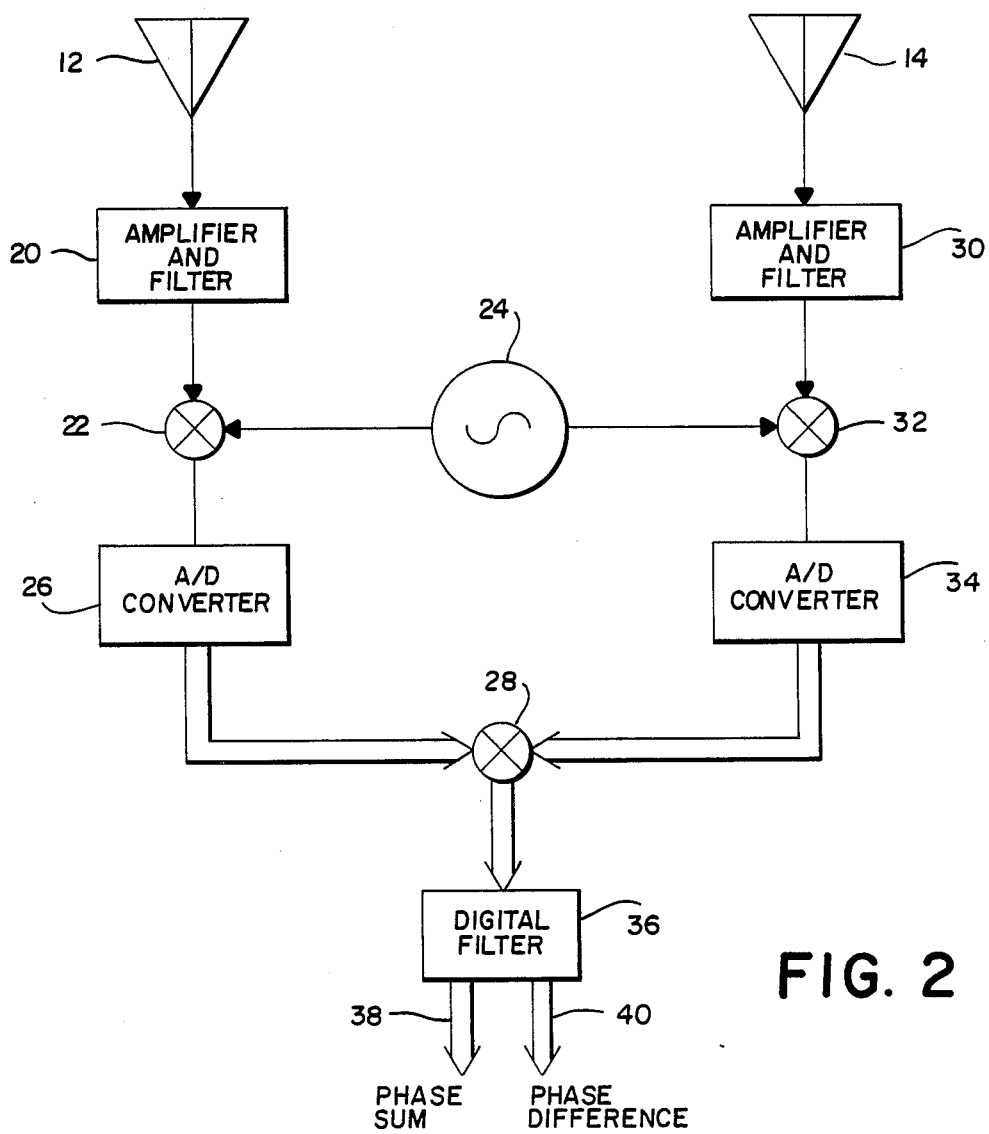
FIG. 2 is a schematic block diagram of the electrical circuitry of the preferred embodiment.

Turning now to FIG. 2, there is illustrated the electrical and processing circuitry that is employed in the preferred embodiment. Specifically, there is shown antenna 12 having its electrical output connected to the input of a conventional amplifier and filter circuit 20. The output from circuit 20 is connected to the first input of a mixer 22. A local oscillator 24 provides the second input to mixer 22. The purpose of this conventional circuitry is to down convert the received signal to a frequency which can be more easily processed.

The down converted signal is then fed to an A/D converter 26 which serves to digitize the signal. This digitized signal is then fed to the first input of a balanced mixer circuit 28, which is preferably implemented as a digital multiplier. It should be understood that analog circuitry could be utilized if desired, although the use of digital circuitry is preferred.

In a similar manner, antenna 14 has its electrical output directed through an amplifier and filter circuit 30 to the first input of a mixer 32. Local oscillator 24 provides a second input to mixer 32 for down converting the received signal. The down converted output from mixer 32 is directed through an A/D converter 34 to a second input of balanced mixer circuit 28.

A balanced mixer acts to multiply the two signals at its inputs. If the two signals are time varying signals with similar frequencies but different phases, their product will be a time varying signal having two components; a high frequency component that has a phase equal to the sum of the input signal phases and, a low frequency component that has a phase equal to the difference of the input signal phases. This is what is obtained as the antennas 12 and 14 rotate, and a signal is received by them from a transmitter located on the Earth, for example. The rotation of the antennas will cause the frequency of the received signals at each of the antennas to be slightly different by virtue of the Doppler shift. Also the rotation and spacing of the antennas will cause their received signals to be time varying and have different phases with respect to one another.

Since the output from balanced mixer circuit 28 consists of two different frequency components, it is fed through a digital filter circuit 36 that acts to separate these two components from one another. Thus, two outputs from digital filter circuit 36 are provided; a high frequency, or phase sum, output 38, and, a low frequency, or phase difference, output 40.

As will be discussed in further detail below, the phase sum and phase difference output signals provide information that can be easily analyzed by a computer, or other suitable means, to determine the azimuth and elevation angles of a received signal relative to the plane of rotation of the receiver 10, and therefore, the direction of the received signal transmitter.

Figure 3:
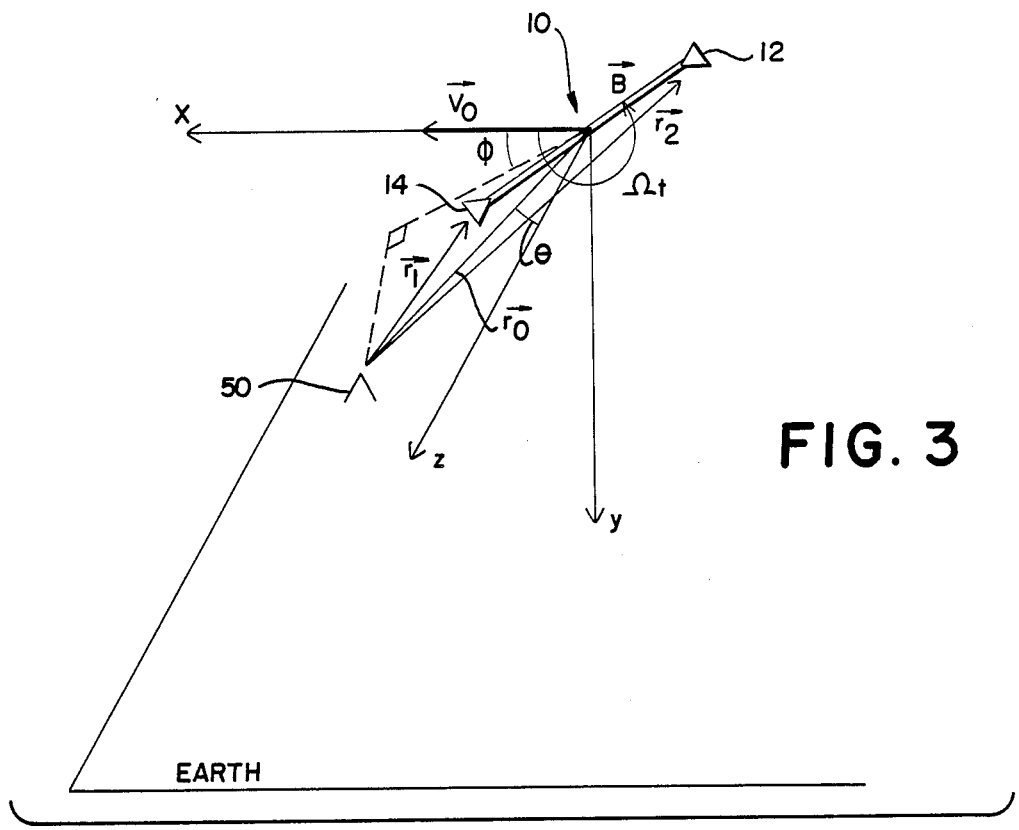
FIG. 3 is a diagrammatic illustration of the source and receiver coordinate system, and, FIG. 4 is a diagrammatic illustration of the receiver coordinate system showing the technique for locating the direction of a received signal.

Turning now to FIG. 3, the geometry that is used to analyze a received signal is shown. Specifically, there is shown a transmitter 50, which can be disposed on the surface of the Earth, for example, and the rotating direction finding receiver 10, which can be disposed on a satellite, for example. Receiver 10 moves with the satellite at a velocity $\vec{V}_o$. Antennas 12 and 14 rotate with a constant radial frequency about the midpoint M of the baseline $\vec{B}(t)$ that separates them. Both antennas therefore move with the velocity of the satellite $\vec{V}_o$, over which their rotational motion $\pm \vec{B}(t)/2$ is superimposed. Transmitter 50 sends out a monochromatic signal at a radian frequency of $\omega_o$ with an unknown phase $\phi_o$. If $\vec{r}(t)$ is the vector from the transmitter 50 to either antenna 12 or 14, then (neglecting relativistic corrections) the phase of the electromagnetic wave at either antenna is:

$$\Phi(\vec{r},t) = 2\pi |\vec{r}|/\lambda_o - \omega_o t + \phi_o$$

where $\lambda_o$ is the transmitter's wavelength.

The displacement vectors $\vec{r_1}(t)$ and $\vec{r_2}(t)$ between transmitter 50, and antennas 12 and 14, respectively, are given by:

$$\vec{r_1}(t) = \vec{r_o} + \vec{V}_o t + \vec{B}(t)/2 \tag{2}$$

$$\vec{r_2}(t) = \vec{r_o} + \vec{V}_o t - \vec{B}(t)/2 \tag{3}$$

where $\vec{r_o}$ is the vector displacement between the transmitter and the baseline midpoint M at $t = o$. It can be assumed that $\vec{r_o}$ is very much greater than the baseline or the distance traveled by the receiver during a measurement interval; hence it is legitimate to approximate the source - antenna ranges by the expansion:

$$|\vec{r_1}(t)| = |\vec{r_o}| + \hat{r}_o \cdot (\vec{V}_o t + \vec{B}(t)/2) \tag{4}$$

$$|\vec{r_2}(t)| = |\vec{r_o}| + \hat{r}_o \cdot (\vec{V}_o t - \vec{B}(t)/2) \tag{5}$$

where $\hat{r}_o$ is the unit vector defined by $\vec{r_o}/|\vec{r_o}|$.

The electromagnetic phase at the antennas can be obtained by substituting equations (4) and (5) into equation (1) as follows:

$$\Phi_1(t) = \bar{\Phi}(t) + \Delta\Phi(t)/2 \tag{6}$$

$$\Phi_2(t) = \overline{\Phi}(t) - \Delta\Phi(t)/2 \tag{7}$$

where, $$\overline{\Phi}(t) = 2\pi|\vec{r_o}|/\lambda_o + \phi_o - (\omega_o - 2\pi \hat{r_o} \cdot \vec{V_o}/\lambda_o)t \tag{8}$$

$$\Delta\Phi(t) = 2\pi \hat{r_o} \cdot \vec{B}(t)/\lambda_o \tag{9}$$

Now, as was stated before, the signal output from balanced mixer 28 consists of two components with equal amplitudes, one having a phase equal to the sum of the input signal phases, and the other having a phase equal to the difference of the input signal phases. The phase sum output is a pure tone with frequency equal to the transmitter frequency Doppler shifted by the relative mean velocity $\vec{V}_o$. The phase difference output has a very complicated frequency structure, but as will be shown, can be utilized to determine the elevation and azimuth angles, $\theta$ and $\phi$ respectively, of the received signal with respect to the plane of rotation of receiver 10.

Since the phase of the phase sum output is equal to the sum of the phases of the signals received by antennas 12 and 14, it can be obtained by adding equations (6) and (7):

$$\Phi_s(t) = \Phi_1(t) + \Phi_2(t) = 2\overline{\Phi}(t) \tag{10}$$

Similarly, the phase of the phase difference output is:

$$\Phi_D(t) = \Phi_1(t) - \Phi_2(t) = \Delta\Phi(t) \tag{11}$$

The amplitudes of the two outputs will both be equal to the square of the amplitude of the received signal. Combining this with equations (10) and (11) yields the two output signals:

$$S_{sum}(t) = A_o^2 \cos(2\overline{\Phi}(t)) \tag{12}$$

$$S_{Diff}(t) = A_o^2 \cos(\Delta\Phi(t)) \tag{13}$$

where $A_o$ is the amplitude of the received signal, and it is assumed that the digital filter circuit 36 has unity gain for both outputs, and that the antenna patterns are identical and constant over the region of interest.

The phase sum output is a pure tone with constant peak output, and so can be used to measure the unknown amplitude $A_o^2$. The frequency of the phase sum channel can also be used to estimate the transmitter frequency (if unknown); however, that measurement is biased by an unknown Doppler shift caused by the antennas' mean component of velocity in the source direction ($\hat{r_o} \cdot \vec{V_o}$).

Assuming that the source wavelength is known to some precision, and that the source broadcast duration is comparable to the antenna rotation period, then the device can determine the location of the transmitter by looking at the phase difference output as the antennas rotate. There are three unknowns in equation (13): the signal amplitude $A_o^2$, and two angles which specify the orientation of the direction vector $\hat{r_o}$. This is made explicit by writing equation (13) in the coordinate system as shown in FIG. 3:

$$S_{Diff}(t) = A_o^2 \cos((2\pi|\vec{B}|/\lambda_o) \sin\theta \cos(\phi - \Omega t)) \tag{14}$$

The angles $\theta$ and $\phi$ are respectfully the elevation and azimuth angles of the transmitter with respect to the plane of rotation.

As stated before, the value of $A_o^2$ can be measured directly from the phase sum input. This leaves only the values of $\theta$ and $\phi$ to be solved for. As will be shown below, solving for these variables from equation (14) can be done by observing the time varying behavior of the signal, over a substantial portion of a rotational cycle, e.g. one-fourth, and employing a curve fitting process with a computer.

As an example, consider the case where the baseline $\vec{B}$ is less than or equal to one half the wavelength of the received signal. Then the phase of the phase difference output signal does not vary through more than one cycle as the antennas rotate through 360 degrees. That is, each phase corresponds to a unique baseline orientation. This is in contrast to when the baseline exceeds one half wavelength; then multiple orientations can result in the same phase, resulting in ambiguities. It should be emphasized that these are ambiguities only in the instantaneous measurement, and can be resolved by other instantaneous measurements as the baseline rotates. Assuming that the signal amplitude $A_o^2$ is known (from the phase sum output or other means), then measurements of the signal represented by equation (14) at two baseline orientations will be sufficient to locate the transmitter up to an ambiguity in the side of the plane of rotation that the signal is originating from. This is illustrated geometrically in FIG. 4.

Figure 4:
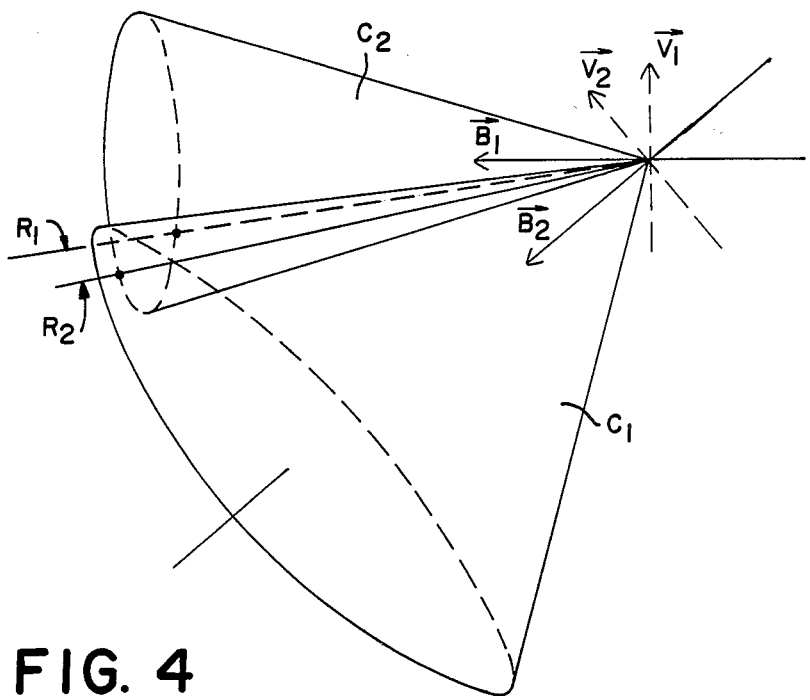

Specifically, in FIG. 4 there is shown a cone $C_1$ about a first baseline $\vec{B}_1$, on which the solution for equation (14) lies. As the antenna's baseline rotates, another measurement is taken which generates a second cone $C_2$ about a second baseline $\vec{B}_2$. The cones $C_1$ and $C_2$ intersect in two different rays of intersection, $\vec{R}_1$ and $\vec{R}_2$, which are symmetrically located on either side of the receiver's plane of rotation. These rays represent the only two possible solutions for equation (14), but there is no way to mathematically eliminate this ambiguity. The simple solution to this problem is to employ directional antennas as antennas 12 and 14. This would eliminate one of the rays of intersection as a solution thereby leaving the remaining ray as the only solution to equation (14). It could also be possible to resolve the ambiguity by later measurements when the geometry of the transmitter relative to the plane of rotation has changed.

Another regime of operation is where the baseline is very many wavelengths long. Then the phase of the phase difference output may vary through a great many cycles while the antennas only rotate through a small angle. In this regime, the instantaneous frequency of the phase difference output signal is measured at different times in the rotation cycle. This can be done by counting the number of output signal cycles over a known measurement period. For sufficiently short measurement periods, the instantaneous radian frequency is the time rate of change of the output phase (in equation (14)):

$$\omega(t) = 2\pi \hat{r_o} \cdot \vec{V}(t)/\lambda_o \tag{15}$$

Each frequency measurement is then seen to fix the location of the source to a cone about the known antenna relative velocity vector $\vec{V}$. This vector is orthogonal to the baseline B (see FIG. 4). A second measurement then fixes the source location to the intersection of two cones. As this construction indicates there again is a single ambiguity, which can be resolved through the use of directional antennas and in this case, it corresponds to a reflection across the plane of rotation.

From equation (15) note that unless $|\vec{V}|$ is an appreciable fraction of the speed of light (unlikely), the instantaneous frequency of the phase difference output will be very much smaller than the frequency of the phase sum output. This indicates that there will not be great practical problems in separating the two signal channels.

A similar analysis would be employed where the baseline is neither less than one half, nor very many wavelengths long. The considerations above suggest a location algorithm that could be utilized for carrying out this analysis, however, in practice, it would probably not be the best method due to the presence of measurement noise. Instead, the use of a least-squares estimator that employs a computer model of the system outputs as a function of signal direction would probably be attractive. The estimation algorithm would process data taken continuously during an interval of the antenna rotation period and generate an estimate of direction that best fits the observed system outputs.

Although the present invention has been set forth in terms of a preferred embodiment, it should be clear that numerous modifications and variations could be made without departing from the true spirit and scope thereof as set forth in the following claims. The receiver and method can be used in a passive device to locate transmitters or scatters from satellites, aircraft, or fixed platforms. Some possible applications of this device include search and rescue, data collection and location services, covert operations support, and tracking.

Besides passive operation, the receiver can also function as the receiver in a bistatic radar system. The analysis in this case is similar except that the transmitter frequency is replaced by the frequency of the radar Doppler shifted by the target's range rate. The target's range can be determined by the time delay between the signal's transmission and reception. The target's range rate can be determined by measuring the phase sum output's frequency shift relative to the known transmission frequency. These measurements are facilitated by having the transmitter and receiver in close proximity. Once the phase sum output's frequency is determined, angle-angle information is extracted exactly as when the device operates passively.

Although in the preferred embodiment, only one baseline and pair of antennas are utilized, it will be understood that additional pairs of antennas or baselines could be employed or desired. The processing for such additional pairs would be similar, with the received signals from each antenna in a pair being multiplied and filtered into phase sum and phase difference channels for that pair. In such an arrangement, a given antenna may be paired with several others.

What is claimed is:

1. A method for locating the direction of arrival of a radio signal that is received by at least one pair of antennas mounted, one at each end of a baseline, comprising:
   continuously rotating the baseline about a common point;
   detecting a radio signal at each of the antennas;
   multiplying the detected signals from the antenna pairs together by passing the signals through a balanced mixer to generate an output, and filtering the output to obtain a phase sum output which is a function of the signal frequency and amplitude, and a phase difference output which is a function of the signal amplitude and direction of arrival; and,
   analyzing the phase sum and difference outputs to determining the azimuth and elevation angles with respect to the baseline plane of rotation, of the received radio signal.

2. The method of claim 1 wherein the step of analyzing comprises observing the phase sum output to determine the signal amplitude, and observing the time varying behavior of the phase difference output to solve for the unknown values of elevation and azimuth angles.

3. The method of claim 2, further including the step of determining the frequency of the radio signal from said phase sum output.

4. Apparatus for locating the direction of a received radio signal comprising:
   at least a first and a second receiving antenna disposed, one at each end, of a first continuously rotating baseline, each of said antennas generating an output responsive to a received radio signal;
   means to multiply the output from each of said receiving antennas, said means to multiply comprising a balanced mixer having two inputs, a first connected to the output of said first antenna, and a second connected to the output of said second antenna; and,
   means to analyze the time varying product of said outputs to determine the azimuth and elevation angles of the received radio signal relative to the plane of rotation of the baseline.

5. The apparatus of claim 4 further including at least a first and a second analog to digital converter, said first converter disposed between said first receiving antenna and said first input of said balanced mixer; and, said second converter disposed between said second receiving antenna and said second input of said balanced mixer.

6. The apparatus of claim 5 further including a digital filter for separating a received signal into two components, a first high frequency signal component that has a phase equal to the sum of the phases of the signals from said first and second receiving antennas; and, a second low frequency signal component that has a phase equal to the difference of the phases of the signals from said first and second receiving antennas;
   said digital filter including an input connected to an output of said balanced mixer and two outputs, one for each of said signal components.

* * * * *